US008000341B2

(12) United States Patent
Yoshikawa

(10) Patent No.: US 8,000,341 B2
(45) Date of Patent: Aug. 16, 2011

(54) METHODS AND SYSTEMS FOR DETECTING COLLISIONS IN ACCESS/UTILIZATION OF RESOURCES OF CONTENTION

(75) Inventor: Cary Y. Yoshikawa, Aurora, IL (US)

(73) Assignee: Alcatel Lucent, Paris (FR)

( * ) Notice: Subject to any disclaimer, the term of this patent is extended or adjusted under 35 U.S.C. 154(b) by 1289 days.

(21) Appl. No.: 11/370,308

(22) Filed: Mar. 8, 2006

(65) Prior Publication Data

US 2007/0211751 A1 Sep. 13, 2007

(51) Int. Cl.
*H04J 1/16* (2006.01)
*H04W 4/00* (2009.01)

(52) U.S. Cl. .......................... 370/445; 370/252; 455/434

(58) Field of Classification Search .......... 370/229–235, 370/445–447, 459–463, 252; 379/112.01–112.1; 455/422.1, 434, 452.1, 455–456.6, 509, 510, 455/515, 516

See application file for complete search history.

(56) References Cited

U.S. PATENT DOCUMENTS 5,418,784 A * 5/1995 Ramakrishnan et al. ...... 370/445
5,657,326 A * 8/1997 Burns et al. .................... 370/349
5,673,259 A * 9/1997 Quick, Jr. ....................... 370/342
5,719,869 A * 2/1998 Ryoo et al. ..................... 370/445
5,940,400 A * 8/1999 Eastmond et al. ............ 370/445
6,044,084 A * 3/2000 Fishman ........................ 370/445
6,078,568 A * 6/2000 Wright et al. ................. 370/312
6,181,683 B1 * 1/2001 Chevillat et al. .............. 370/329
6,535,736 B1 * 3/2003 Balogh et al. ................. 455/434
6,545,994 B2 * 4/2003 Nelson et al. ................. 370/337
6,643,296 B1 * 11/2003 Fukuhara ...................... 370/445
6,765,924 B1 * 7/2004 Wu et al. ....................... 370/447
6,848,010 B1 * 1/2005 Wu et al. ............................ 710/7
7,016,371 B1 * 3/2006 Petranovich .................. 370/445
7,104,534 B2 * 9/2006 Currivan et al. ................ 269/32
7,420,986 B1 * 9/2008 Howard et al. ............... 370/445
7,626,919 B2 * 12/2009 Miyoshi et al. ............... 370/208
2002/0118661 A1 * 8/2002 Voce ............................. 370/337
2004/0190471 A1 * 9/2004 Bender et al. ................. 370/329
2004/0252648 A1 * 12/2004 Ojard et al. .................. 370/252
2004/0252655 A1 * 12/2004 Lim et al. ...................... 370/321
2004/0259528 A1 * 12/2004 Gandhi et al. ................ 455/411
2005/0195746 A1 * 9/2005 Golovinsky et al. .......... 370/241
2006/0159035 A1 * 7/2006 Waxman et al. .............. 370/282

* cited by examiner

*Primary Examiner* — Aung S Moe
*Assistant Examiner* — Prince Mensah
(74) *Attorney, Agent, or Firm* — Fay Sharpe LLP

(57) ABSTRACT

Systems and methods are described for detecting collisions in packets related to attempted access or utilization of a resource or pool of resources in a given timeslot in which the energy level of corrupted received access probe packets are compared with a threshold energy level, and if above the threshold, the timeslot is marked as a collision slot.

22 Claims, 6 Drawing Sheets

METHODS AND SYSTEMS FOR DETECTING COLLISIONS IN ACCESS/UTILIZATION OF RESOURCES OF CONTENTION

FIELD OF THE INVENTION

The invention relates to communications systems in general, and more particularly to collision detection systems and methods for detecting collisions in packets related to access or utilization of a resource or pool of resources.

INCORPORATION BY REFERENCE

The following previously filed and currently pending U.S. patent applications are hereby incorporated by reference in their entireties as if fully set forth herein: Yoshikawa Ser. No. 11/193,522, filed Jul. 29, 2005, entitled METHODS AND SYSTEMS FOR UTILIZATION OF RESOURCES OF CONTENTION UNDER ANY LOAD TO FACILITATE DESIRED BANDWIDTH ACROSS SINGLE OR MULTIPLE CLASSES OF DEVICES; and Yoshikawa Ser. No. 11/257,337, filed Oct. 24, 2005, entitled METHODS AND SYSTEMS FOR ESTIMATING ACCESS/UTILIZATION ATTEMPT RATES FOR RESOURCES OF CONTENTION ACROSS SINGLE OR MULTIPLE CLASSES OF DEVICES.

BACKGROUND OF THE INVENTION

In communications and computing systems, many system resources are shared for use by large numbers of devices. For example, shared resources are commonplace in wireless, wireline, LAN, WAN, WIMAX, Blue Tooth wireless mobile communications systems, in which resources or pools of resources (hereinafter "resources" collectively) such as network elements, base stations, networks, servers, communications media, etc. are shared among multiple devices that require access to or continued utilization of the shared resources. Resource contention can occur in mobile communications systems such as Evolution Data Only (EVDO)-wireless networks, when multiple cell phones, PDAs, portable computers, etc. attempt to simultaneously access a local base station resource such that the input handling capacity of the base station is exceeded (access attempt failure), or when the base station is operating at maximum capacity and is unable to service any additional information from one or more currently served devices (utilization attempt failure). Contention may arise when multiple mobiles simultaneously attempt to access the base station on the access channel, leading to a collision of the call initiation messages. When a mobile device fails to obtain access or utilization of the base station, an internal apersistence system will cause the mobile to back off and refrain from further attempts for a given amount of time, where the time is determined according to an apersistence value provided by the base station resource or an apersistence control system associated therewith. By selecting the apersistence values, the apersistence control system sets the back off behavior of the mobile devices in a manner that ideally maximizes the access and utilization of the base station resource, and may also support multiple priority classes with different apersistence for each class. To accurately determine the apersistence values sent to the mobile devices, the apersistence control system must have data or information regarding the amount of incoming traffic such as requests for access or utilization of the access channel for a base station resource. In this regard, the mobile devices in EVDO systems send access probe requests to the base station access channel in discrete timeslots, and incoming traffic estimation systems may be constructed to operate on timeslot information that indicates whether a particular timeslot was empty (no access probe packets), or contained either a successful single probe or a collision of multiple probe packets. Thus, there is a need for techniques and systems to distinguish between the three possible conditions in a given timeslot in an unambiguous and robust way to facilitate implementation of traffic estimation systems and control systems for adjusting the resource to minimize collisions.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter.

The invention relates to systems and methods for detecting collisions in packets for attempting access or utilization of a shared resource, and may be implemented in conjunction with any system in which access probe messages or packets associated with access/utilization attempts are subject to collisions, and finds particular utility in association with mobile communications system applications related to shared base station resources. In general, the present invention employs energy information for a given time period (timeslot) to differentiate between corrupt or invalid received packets caused by actual collisions of access probes and those attributable to other causes, such as bad RF conditions which are more properly characterized as empty slots for purposes of incoming traffic estimation and apersistence control. In certain embodiments, the energy levels of corrupted received access probe packets are compared to a threshold value set to a value that has a high assurance of a single access probe being successfully received, so that if the measured energy exceeds the threshold level, the timeslot is presumed to correspond to a collision, whereas lower energy corrupted timeslots are deemed to be empty. The invention may thus be advantageously employed to unambiguously map success/empty/collision timeslots to a traffic load estimate in association with advanced apersistence control and estimation technologies related to wireless communications systems as well as in other situations requiring accurate estimation of incoming traffic destined for a resource of contention.

In accordance with one or more aspects of the invention, collision detection methods are provided for detecting collisions in packets related to attempted access or utilization of a base station or other resource or pool of resources. The method includes determining whether a received packet is a corrupted access probe indicating an attempted access or utilization of the resource or pool of resources, and determining whether the received packet is indicative of a collision in the corresponding timeslot based at least in part on the energy of the received packet. In one implementation, the method includes marking the timeslot as successful if a preamble of a received packet indicates the received packet corresponds to an access probe packet and if the received packet passes a checksum test. In this example, if the preamble indicates an access probe preamble but the checksum fails or other test indicates the packet is corrupted, the received packet energy is measured and compared with a threshold energy level above which a single packet is likely to be received without error by the resource or pool of resources. The timeslot is then marked as a collision if the measured energy is above the threshold energy level, and may otherwise be marked as an empty slot. The method may thus be used to differentiate between corrupted access attempts attributable to collisions and other situations for which the timeslot data is more properly characterized as an empty slot.

Further aspects of the invention involve wireless system base station resources that receive access probes data packets in certain predefined time periods or slots. The base station resource includes an energy measurement system that measures an energy associated with incoming packets in a given time period, as well as a collision detection system which provides timeslot data including an indication of empty, collision, or successful access/utilization attempts in the given time period, where the collision detection system determines whether a received packet indicates a collision in the given timeslot based at least in part on the measured energy of the received packet. In one example, the collision detection system compares the measured energy of the received packet with a threshold energy level, and sets the timeslot data indication to collision if the received packet is a corrupted access attempt packet and the energy of the received packet is above the threshold. Any suitable threshold value may be used, such as a level above which a single packet is likely to be received without error by the base station resource in one example. The system may also determine whether no packet has been received in the given time period and to determine whether a received packet is an access probe packet, such as by suitable preamble testing. In this case, the collision detection system sets the timeslot data indication to empty if no packet is received in the given time period or if a received packet is not an access probe packet. The system may also be operative to determine whether a received packet is corrupted, for example, using checksum or other suitable testing, where the timeslot data indication is set to successful if the received packet is an uncorrupted access probe packet.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION OF THE INVENTION

Figure 1:
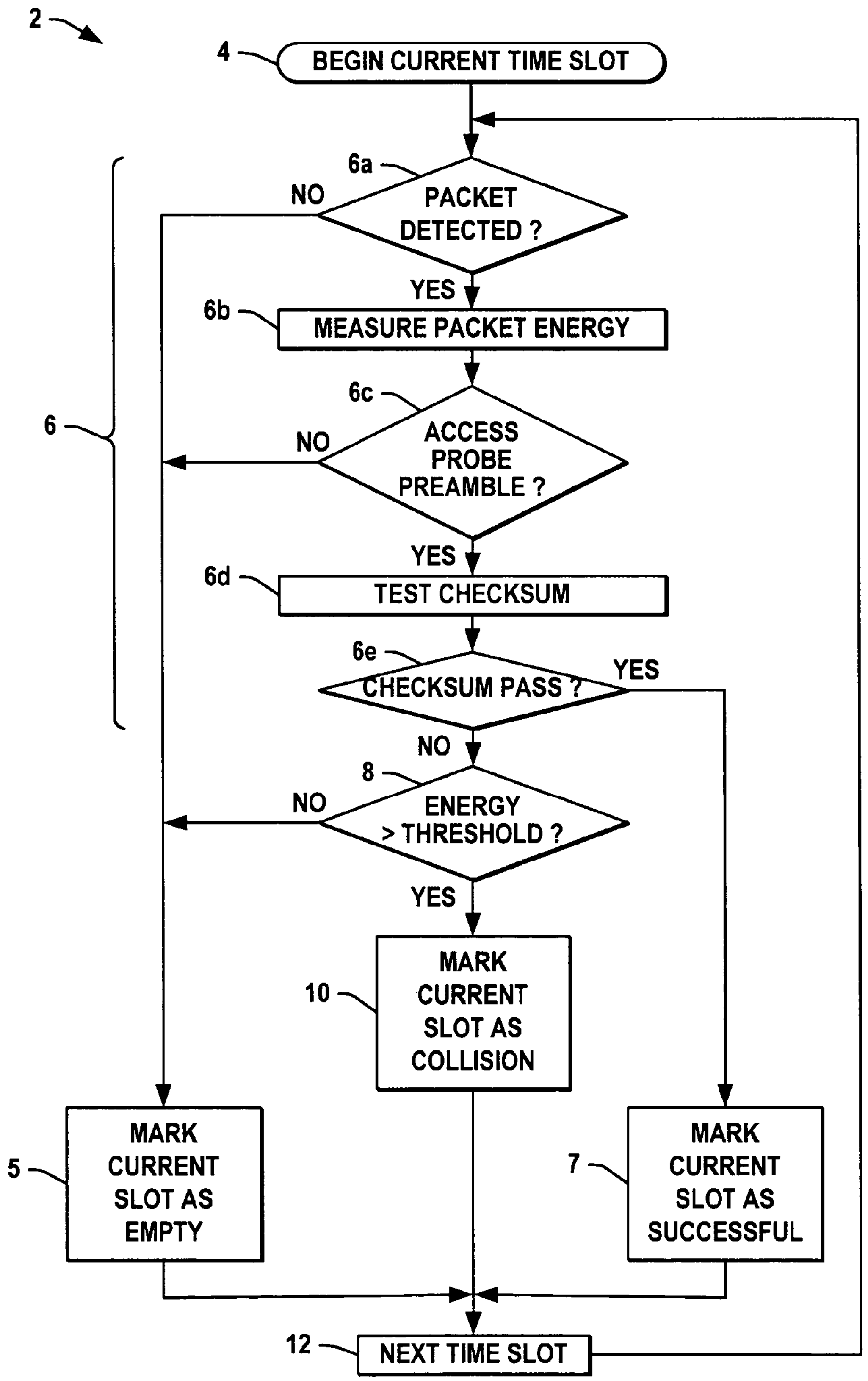
FIG. 1 is a flow diagram illustrating an exemplary collision detection method in accordance with one or more aspects of the invention.

Referring now to the drawings, several embodiments or implementations of the various aspects of the present invention are hereinafter illustrated and described in conjunction with the drawings, wherein like reference numerals are used to refer to like elements. FIG. 1 shows a simplified flow diagram illustrating a method 2 for detecting collisions in packets related to attempted access or utilization of a resource or pool of resources in accordance with one or more aspects of the invention. Although the method 2 is illustrated and described below in the form of a series of acts or events, the methods of the invention are not limited by the illustrated ordering of such acts or events, wherein some acts or events may occur in different order and/or concurrently with other acts or events apart from those illustrated and described herein in accordance with the invention, and not all illustrated steps may be required to implement a process or method in accordance with the present invention. Furthermore, the methods of the invention can be used in a variety of applications, for example, including without limitation data analysis or acquisition situations in which the collision detection information is used to derive a measure of system utilization, and control situations wherein the estimated value is used as system feedback to control one or more facets of the system operation, such as apersistence parameters, etc.

The method 2 begins for a given time period or time slot at 4, with a determination being made at 6 as to whether or not a received packet is a corrupted access probe, wherein an access probe is any data message or packet associated with an attempt to access or utilize a shared resource or pool of resources. Thereafter, the method 2 includes determining whether the received packet indicates a collision occurred in the given timeslot based at least in part on an energy of the received packet. At 6*a*, a determination is made as to whether a packet was detected in the current time slot. If not (NO at 6*a*), the slot is marked as an "empty" slot at 5 and the method 2 proceeds to the next time slot at 12 and returns to 6*a*. Otherwise (YES at 6*a*), the energy is measured for the received packet at 6*b*. The energy measurement at 6*b* can be any suitable characterization of the energy associated with the received packet in the current timeslot, including but not limited to average, peak, median, energy over all or a portion of the length of the received packet, over all or a portion of the entire length of the time slot, or other suitable measurement by which timeslots including corrupted access probe packets can be accurately and repeatably distinguished from truly empty timeslots and timeslots in which non-access probe data is received, for example, by comparison with a suitable threshold energy value.

At 6*c*, a determination is made as to whether a preamble of the received packet corresponds to that of a recognized access probe, which may be accomplished using any suitable preamble recognition, parsing, or reading and comparison techniques. For instance, where a correct access probe is defined as having all binary "1"s or all "0"s or some predefined pattern thereof, the received preamble can be compared at 6*c* in suitable hardware or software logic with the known acceptable preamble (or with a plurality of acceptable preambles) to ascertain whether the packet is indeed an access probe attempting to initiate or request access or utilization of the resource. If the preamble does not match an acceptable access probe preamble (NO at 6*c*), the method proceeds to 5 where the current timeslot is marked as empty. Otherwise (YES at 6*c*), the method 2 proceeds to determine whether the access probe packet is corrupted at 6*d*, in one example by performing a checksum test on the received access probe packet. Alternatively, other suitable tests can be performed at 6*d* using suitable logic, whether hardware, software, or combinations thereof, to determine whether the received access probe is corrupted, for example, by checking a checksum field of the packet. In the illustrated example, a determination is made at 6*e* as to whether the corruption test (e.g., checksum) passed. If so, the method 2 proceeds to 7 where the current timeslot is marked "successful", and the method 2 proceeds to the next slot at 12.

If, however, the access probe packet is corrupted (NO at 6*e*), the measured energy is compared with a threshold value at 8. Any suitable comparison can be performed at 8 to determine whether the measured energy of the received packet is above the threshold energy level or not, for instance, in hardware, software, or combinations thereof, etc. Moreover, any suitable energy threshold level may be used at 8 which allows actual or probable collisions to be distinguished from other situations, such as weak signals, bad RF conditions, or noise in the channel between the resource and the requesting device, etc. In one possible implementation, the measured energy is compared with a threshold energy level above which a single packet is likely to be received without error by the resource. If the received packet energy is less than or equal to the threshold (NO at 8), the method 2 provides for marking the time slot as empty at 5. In this manner, the method presumes that the received information is not a collision of two or more access probes attempting to use the resource, which is useful in ascertaining appropriate control actions to take with respect to apersistence control applications in wireless communications systems, as described further below. However, if the measured energy is above the threshold energy level (YES at 8), the current timeslot is marked as a collision at 10, and the method 2 proceeds to the next timeslot at 12. The method 2 may thus be operated essentially as a continuous loop to identify the timeslot data for each successive timeslot, with the data including an indication of either "empty", "successful", or "collision" for attempts to access or utilize the resource in each timeslot.

Figure 2:
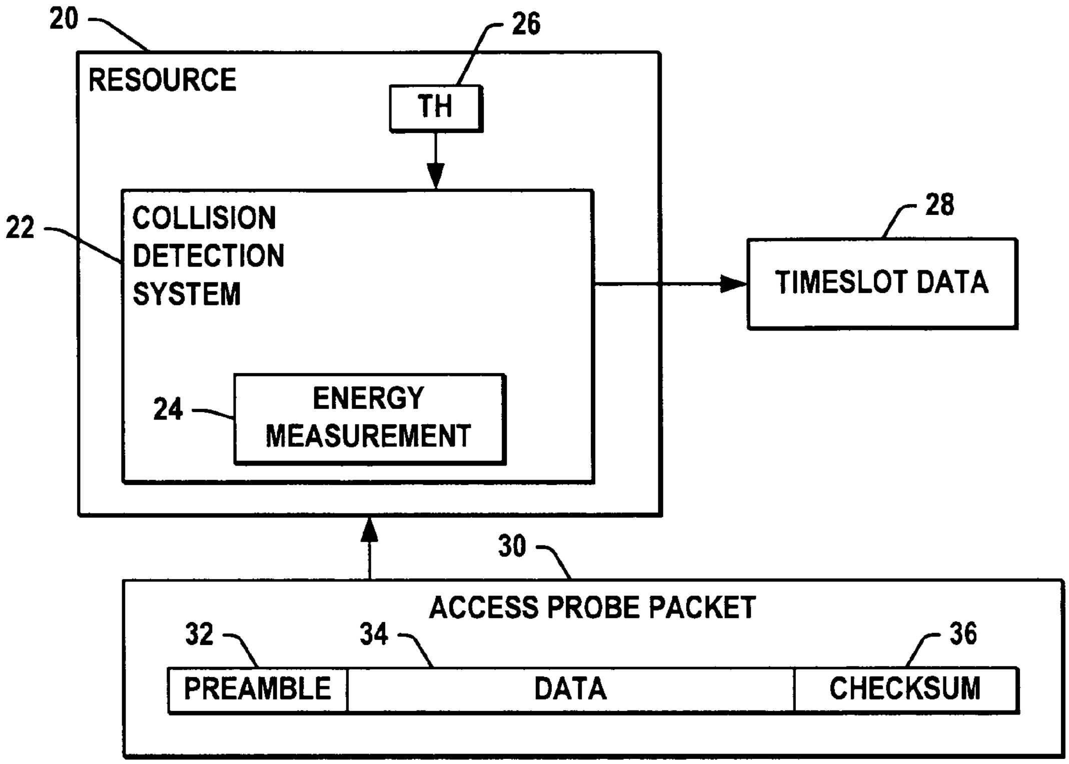
FIG. 2 is a simplified schematic diagram illustrating a resource with an exemplary collision detection system according to further aspects of the invention.

Referring also to FIG. 2, the techniques embodied in the exemplary method 2 may be advantageously employed to differentiate between corrupted access attempts attributable to collisions and other situations for which the timeslot data is more properly characterized as an empty slot based at least in part on the measured energy of the received packet. This information may be particularly useful in measuring or estimating current incoming access probe traffic for use in closed loop type control of the resource utilization, such as apersistence control in wireless communications systems. FIG. 2 schematically illustrates an exemplary resource 20, which can be a wireless system base station in one example, which is operable to receive incoming data packets 30 in a given time period, including access probe type packets that request access or utilization of the resource 20. The resource 20 includes a collision detection system 22 with an energy measurement system 24 operative to measure an energy associated with the incoming packets 30 in the given time period. Any suitable energy measurement system or apparatus may be employed, such as hardware, software, combinations thereof, etc., that is operatively associated with the resource and the collision detection system 22 for measuring and or analyzing energy for the received packet 30, for example, average energy or power, peak energy or power, median energy or power, etc., which can be measured over all or a portion of the temporal length of the received packet 30, over all or a portion of the entire length of the time slot, or other suitable measurement period by which timeslots including corrupted access probe packets can be accurately and repeatably distinguished from truly empty timeslots and timeslots in which non-access probe data or corrupted single access probe data is received by the resource.

The collision detection system 22 can be any suitable hardware, software, or combinations thereof, etc., which operates to provide timeslot data 28 for a given timeslot period according to the principles set forth herein, wherein the timeslot data 28 provides an indication of attempts to access or utilize the resource 20 in the given time period, and where the indication has a value of empty, collision, or successful. In particular, the exemplary collision detection system 22 operates to determine whether a received packet 30 indicates a collision in the given timeslot based at least in part on the measured energy of the received packet, thereby facilitating differentiation between collision slots and empty slots from the perspective of closed loop control feedback information, wherein the timeslot data 28 may be used to estimate incoming access/utilization traffic requesting use of the resource 20. In the illustrated embodiment of FIG. 2, moreover, the collision detection system 22 compares the measured energy of the received packet 30 with a threshold energy level 26 and sets the timeslot data indication to collision for the given time period if the energy of a corrupted access probe packet is greater than the threshold 26.

In general, the system 22 may be operated in accordance with the above-described method 2 of FIG. 1 or other suitable operational method. In one embodiment, the threshold energy 26 is set to a level above which a single packet 30 is likely to be received without error by the resource, although other suitable levels 26 may be used by which the system 22 can differentiate between actual collisions of two or more access probe packets 30 and other timeslot conditions. In the illustrated example, moreover, the incoming access probe packet 30 includes a preamble portion 32, a data or payload portion 34, and a checksum portion or field 36, where any of the fields or portions 32, 34, 36 may be a single bit or multiple bits, and where the information of the fields or the packet 30 generally may be binary, trinary, decimal, or other suitable data format. In operation, the collision detection system 22 determines for a given time slot whether a packet 30 has been received, and if not, sets the timeslot data 28 to indicate "empty". However, if a packet 30 was indeed received in the timeslot, the system 22 determines whether the received packet 30 is an access probe packet or not, for example, by checking the preamble field 32. If the preamble 32 does not indicate an access probe type packet, the data 28 is also marked “empty”. The system 22 also determines whether received access probe packets 30 are corrupted, for example, by checking the checksum portion 36 using known verification techniques, and if uncorrupted, the system 22 sets the timeslot data 28 to indicate a “successful” timeslot.

It is noted that while the packet 30 is illustrated as a unitary packet for purposes of explaining the operation of the collision detection system 22, in practice the access probe data or packet 30 may be a single packet with respect to upper layers and may be segmented or partitioned into smaller portions or sub-packets by lower network layers, with or without padding and other additions of various control or padding bits. In one example, an upper layer in the sender (the entity requesting access or utilization of the resource 20, such as a mobile phone) may, create the packet 30 including the data field 34 and the checksum 36 (with or without padding), and provide this to one or more lower layers which may add the preamble 32 to identify the packet 30 as an access probe. The lower layer(s) may also segment the packet 30 into smaller sub-packets for transmission through the communications channel, with the receiving entity (e.g., the resource 20 or another element associated therewith, such as the collision detection system 22) receiving the individual sub-packets and reassembles the unitary packet 30, which may including removal of control or padding bits or other information associated with the lower layer(s). The receiving entity checks the preamble (e.g., before or after re-assembly) to verify that the received packet 30 is indeed an access probe requesting resource access or utilization, and performs a verification, such as a checksum test, on the reconstructed packet 30 to ascertain whether the access probe 30 has been corrupted. Thus, regardless of the specific form of the access probe 30 and regardless of whether the packet 30 or the data thereof has been modified, reformatted, segmented, padded, augmented, or otherwise changed, the invention provides for determining therefrom whether the packet is an access probe and if so, whether the packet 30 has been corrupted.

Figure 3:
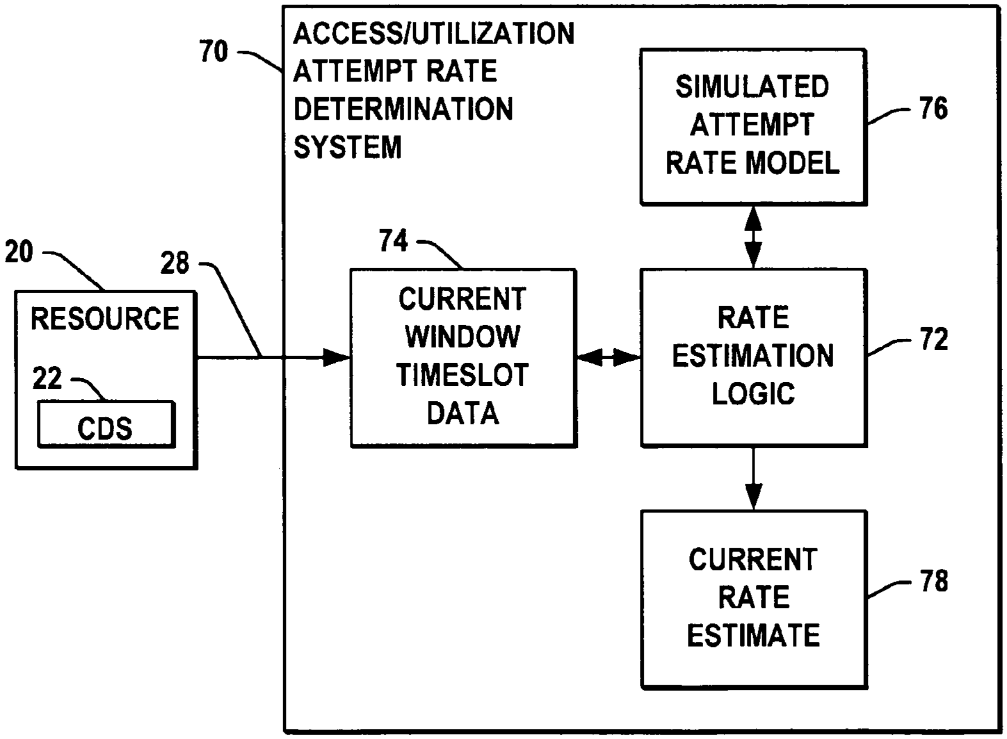
FIG. 3 is a schematic diagram illustrating the resource and collision detection system of FIG. 2 providing timeslot data to an exemplary system for determining an access/utilization attempt rate.

Referring now to FIGS. 3-6B, the timeslot data 28 may be used for many purposes, and finds particular utility as an input to rate estimation systems for use in closed-loop adaptation of a resource with respect to access or utilization. FIG. 3 shows an exemplary rate estimation system 70 that uses the timeslot data 28 from the collision detection system (CDS) 22 in the resource 20 to derive one or more current rate estimates 78 of attempts to access or utilize the resource 20. In general, the CDS 22 and/or the access/utilization attempt rate determination system (MRDS) 70 may be integrated into the resource 20 or other connected network element operatively associated with the resource 20, or may be provided as separate components, where the system 70 may be implemented in hardware, software, or combinations thereof, and the AARDS 70 may provide the estimate 78 to any system component, for example, to an apersistence control system 160 associated with a base station resource 150 in a wireless network 190 as described below in connection with FIG. 5. The exemplary MRDS 70 of FIG. 3 includes a simulated rate model 76 and rate estimation logic 72 which obtains a plurality of timeslot data values 28 forming a current rate analysis timeslot data window 74 indicating the number of successful, empty, and collision timeslots 28 observed for the resource 20 in the current window 74. The estimation logic 72 in this embodiment provides the current attempt rate 78 based on the current rate analysis window timeslot data 74 and the simulated attempt rate model 76, which can be equations, formulas, algorithms, curves, data files, etc., by which the logic 72 obtains or derives the estimate 78 of an actual attempt rate corresponding to the current window data 74, wherein the exemplary model 76 maps simulations of attempt rates to observed data in an integer number of successive timeslots 28 forming the rate analysis window 74.

Figure 4:
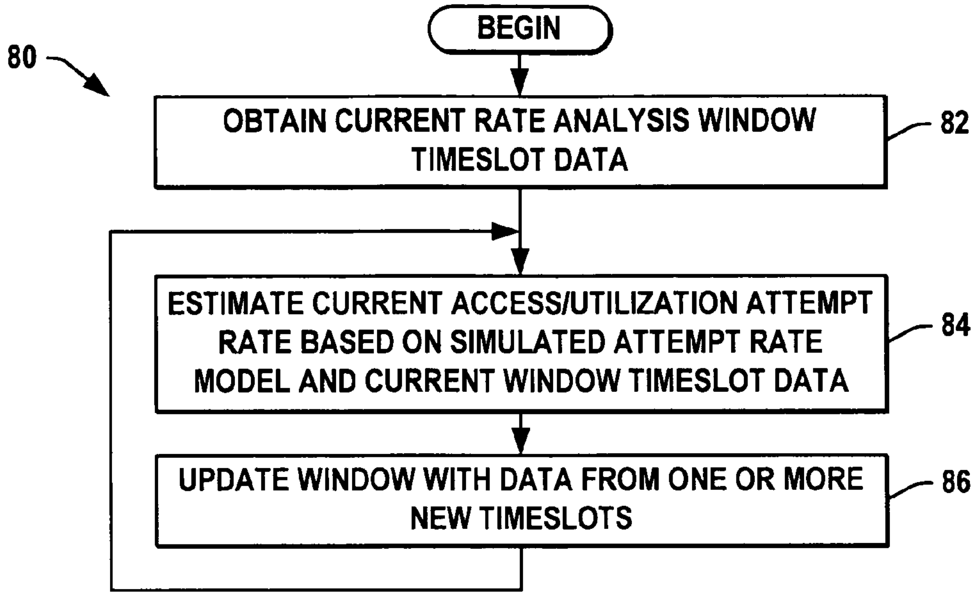
FIG. 4 is a flow diagram illustrating operation of the rate determination system of FIG. 3 for estimating a rate of attempted access or utilization of the resource.
Figure 6A:
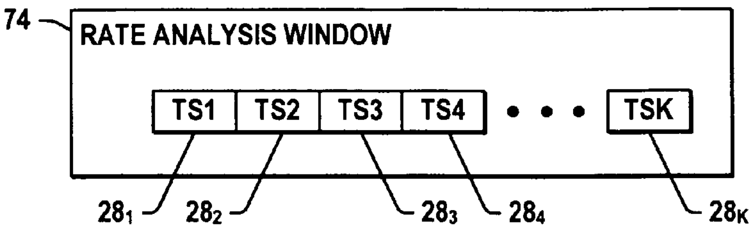
FIGS. 6A and 6B are schematic diagrams illustrating an exemplary rate analysis interval or window including a number of timeslots for which data is obtained from the collision detection system to indicate the number of empty, successful, and collision timeslots.
Figure 6B:
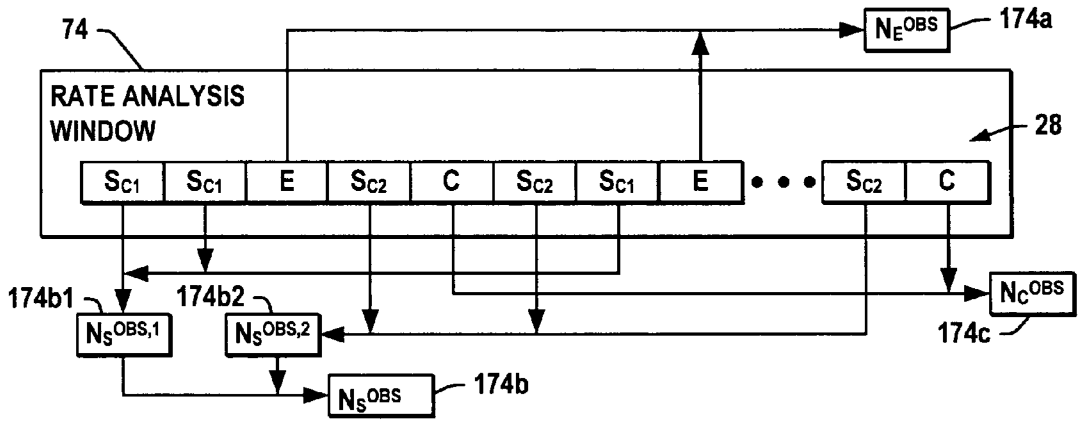

FIG. 4 provides a flow diagram 80 illustrating operation of the exemplary MRDS 70 of FIG. 3 in estimating or determining a rate of attempted access/utilization of a resource or pool of resources, wherein the current rate analysis window timeslot data is obtained from the collision detection system 22 at 82, where the data window corresponds to a plurality of timeslots forming a current rate analysis window. FIGS. 6A and 6B illustrate one such rate analysis window 74 having an integer number K timeslots $28_1$-$28_K$, where K is a positive integer greater than 1 for which timeslot data 28 is obtained with indications of empty, successful, and collision timeslots 28. As shown best in FIG. 6B, each timeslot 28 has one of three identified values, including empty (E), successful (S), and collision (C), wherein the success data (e.g., $S_{C1}$, $S_{C2}$) may also indicate a priority class of the device that successfully accessed or utilized the resource in a particular timeslot 28 (e.g., class 1, class 2, etc.). In FIG. 6B, timeslot data 174 may be tabulated from the window data entries 28 to totalize the number of observed empty timeslots $N_E^{OBS}$ 174*a* in which no attempts occurred, the observed number of timeslots $N_S^{OBS}$ 174*b* in which a successful attempt occurred, and the observed number of timeslots $N_C^{OBS}$ 174*c* in which a collision occurred for the subject window 74. With this information obtained at 82 in FIG. 4, the current access/utilization attempt rate is estimated at 84 based on a simulated attempt rate model (model 76 in FIG. 3) and the current rate analysis window timeslot data 174. The window 74 is then updated at 86 with data 28 from one or more new timeslots 28 obtained from the collision detection system 22, and another estimate 78 is thereafter generated in similar fashion.

Figure 5:
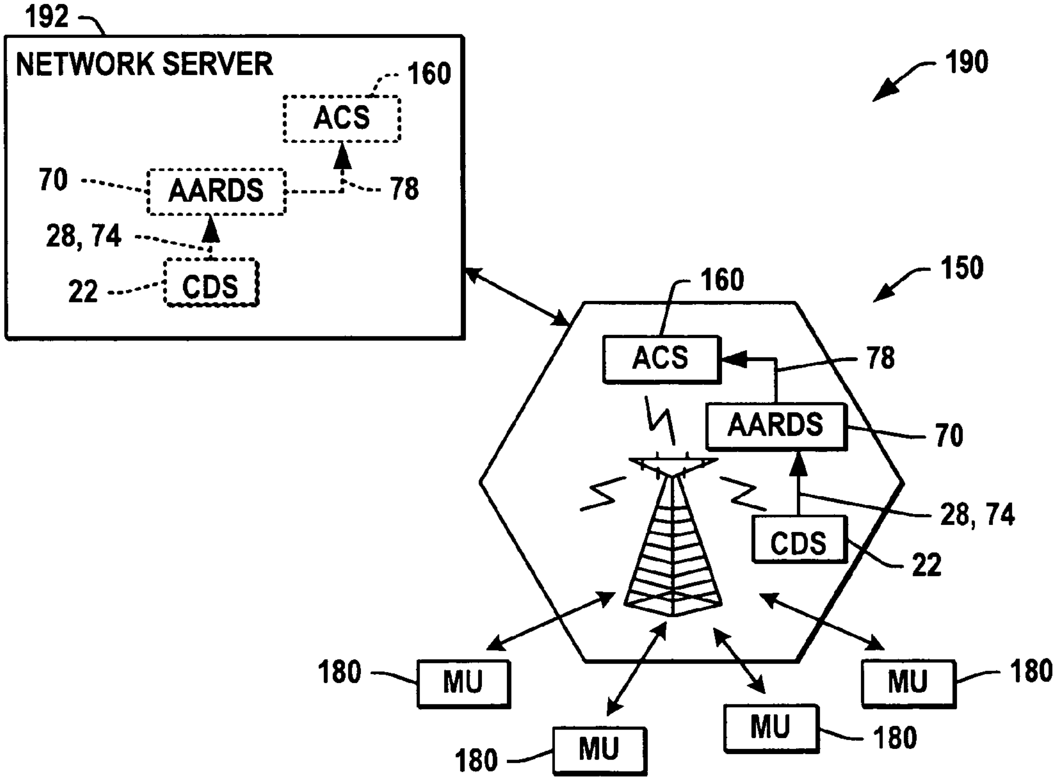
FIG. 5 is a simplified schematic diagram illustrating a mobile communications system with a collision detection system and a rate determination system integrated in a base station resource.

FIG. 5 shows an exemplary application of the collision detection system 22 in providing timeslot data 28 for use in controlling apersistence in a mobile communications system 190 in combination with the AARDS 70, where the communications system 190 includes a base station resource 150 providing communications services for a number of mobile communications units (MUs) 180, and where the system 190 includes an access/utilization attempt rate determination system (AARDS) 70 with a simulation model and estimation logic as described in association with the system 70 of FIG. 3 above. The collision detection system 22 provides timeslot data 78 to the MRDS 70, where one or both of the systems 22 and/or 70 may be integrated in the base station resource 150 or may be implemented in another system component (e.g., such as in a network server 192 of communications system 190, shown in dashed lines in FIG. 5).

The system 190 also includes an apersistence control system (ACS) 160 operatively associated with the base station resource 150, where the ACS 160 uses the attempt rate estimate 78 from the MRDS 70 to control apersistence of the mobile units 180 in attempting to access/utilize base station resource 150. In operation, the collision detection system 22 provides the data 28 indicating whether each individual timeslot was empty, successful, or a collision, and a number of these data values 28 are formed into a data window 74 by the MRDS 70. The MRDS 70, in turn, estimates a current attempt rate 78 for the base station 150 based on the simulated attempt rate model 76 (FIG. 3) and provides the attempt rate 78 to the apersistence control system 160 for apersistence value adjustment/control in accordance therewith.

Figure 7:
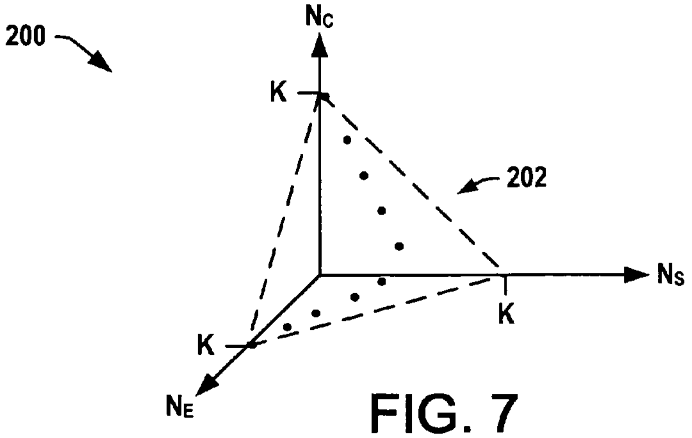
FIG. 7 is a three dimensional plot illustrating the relationship between the number of empty, successful, and collision timeslots in a given rate analysis window.

Referring also to FIG. 7 and to TABLE 1 below, FIG. 7 provides a plot 200 illustrating a three dimensional graph of the system attempt data for a given number K timeslots 28 per second window length), where the number of empty timeslots ($N_E$) plus number of success timeslots ($N_S$) plus number of collision timeslots ($N_C$) equal to number of timeslots in rate analysis interval ($N_I$).

TABLE 1

| BHCA | Percent of 6500 | EMPTY Cycles ($N_E$) | SUCCESS Cycles ($N_S$) | COLLISION Cycles ($N_C$) |
|---|---|---|---|---|
| 650 | 10 | 54.852159 +/− 1.331850 | 1.046512 +/− 1.091113 | 0.101329 +/− 0.432905 |
| 1300 | 20 | 53.935216 +/− 1.739932 | 1.852159 +/− 1.403509 | 0.212625 +/− 0.597314 |
| 1950 | 30 | 52.503322 +/− 2.495342 | 3.076412 +/− 1.908403 | 0.420266 +/− 0.940659 |
| 2600 | 40 | 51.063123 +/− 3.163748 | 4.277409 +/− 2.239287 | 0.659468 +/− 1.525634 |
| 3250 | 50 | 49.918605 +/− 3.425285 | 5.232558 +/− 2.397896 | 0.848837 +/− 1.673143 |
| 3900 | 60 | 48.327243 +/− 3.867518 | 6.579734 +/− 2.558509 | 1.093023 +/− 1.965141 |
| 4550 | 70 | 47.509967 +/− 3.979691 | 7.252492 +/− 2.714432 | 1.237542 +/− 1.938863 |
| 5200 | 80 | 45.777409 +/− 4.762843 | 8.564784 +/− 2.821363 | 1.657807 +/− 2.795199 |
| 5850 | 90 | 43.720930 +/− 5.668752 | 9.661130 +/− 3.057823 | 2.617940 +/− 3.606962 |
| 6500 | 100 | 42.594684 +/− 6.140804 | 10.227575 +/− 3.203980 | 3.176080 +/− 4.041589 |
| 7150 | 110 | 40.629568 +/− 7.222197 | 11.290698 +/− 3.222153 | 4.079734 +/− 5.498440 |
| 7800 | 120 | 38.021595 +/− 8.553401 | 12.523256 +/− 3.296070 | 5.451827 +/− 7.259900 |
| 8450 | 130 | 36.539867 +/− 9.072021 | 13.244186 +/− 3.455725 | 6.212625 +/− 7.833269 |
| 9100 | 140 | 33.646179 +/− 10.806793 | 13.787375 +/− 3.625487 | 8.563123 +/− 10.750887 |
| 9750 | 150 | 30.501661 +/− 11.931456 | 14.857143 +/− 4.024781 | 10.634551 +/− 12.500073 |
| 10400 | 160 | 27.440199 +/− 12.752197 | 15.069767 +/− 4.392509 | 13.483389 +/− 14.204155 |
| 11050 | 170 | 22.553156 +/− 13.652717 | 14.559801 +/− 5.042732 | 18.875415 +/− 16.499756 |
| 11700 | 180 | 18.900332 +/− 13.452267 | 14.513289 +/− 5.591046 | 22.559801 +/− 16.822720 |
| 12350 | 190 | 13.355482 +/− 12.981070 | 11.833887 +/− 6.225202 | 30.789037 +/− 17.563847 |
| 13000 | 200 | 8.669435 +/− 10.854460 | 10.019934 +/− 6.461715 | 37.294020 +/− 16.050841 |
| 13650 | 210 | 7.106312 +/− 9.469763 | 9.044850 +/− 6.563742 | 39.837209 +/− 15.084152 |
| 14300 | 220 | 4.431894 +/− 7.586895 | 7.102990 +/− 6.416291 | 44.460133 +/− 13.158473 |
| 14950 | 230 | 2.780731 +/− 5.458855 | 5.612957 +/− 5.247499 | 47.589701 +/− 9.956521 |
| 15600 | 240 | 2.413621 +/− 4.624435 | 5.207641 +/− 5.247535 | 48.368771 +/− 9.188333 |
| 16250 | 250 | 1.617940 +/− 4.307940 | 3.898671 +/− 4.384892 | 50.480066 +/− 8.120179 |
| 16900 | 260 | 1.285714 +/− 3.432998 | 3.285714 +/− 4.036967 | 51.423588 +/− 6.980393 |
| 17550 | 270 | 0.837209 +/− 2.131884 | 2.702658 +/− 3.197740 | 52.458472 +/− 4.876457 |
| 18200 | 280 | 0.661130 +/− 2.195915 | 2.289037 +/− 3.066730 | 53.049834 +/− 4.875272 |
| 18850 | 290 | 0.574751 +/− 1.966977 | 1.906977 +/− 2.959525 | 53.516611 +/− 4.562292 |
| 19500 | 300 | 0.513289 +/− 2.142124 | 1.584718 +/− 2.868716 | 53.898671 +/− 4.776190 |
| 26000 | 400 | 0.048173 +/− 0.309332 | 0.255814 +/− 0.662980 | 55.696013 +/− 0.869729 |

window 74, where the plotted plane 202 is the solution to the equation $N_S+N_E+N_C=K$. As shown in the plot 200, simply attempting to estimate the access/utilization attempt rate based solely on success rates (without differentiating actual empty slots from collision slots) leads to an ambiguity for all conditions except at maximal throughput (maximum $N_S$) in a closed loop control of apersistence in the wireless system 190. The collision detection techniques of the present invention facilitate drawing distinctions between received access probe packets having corrupt checksums due to actual collisions between two or more access probes of sufficient energies (that would have otherwise been correctly received if sent individually), and probes corrupted due to weak signal strength, thermal noise, interference from other weak mobile units 180, or other causes unrelated to actual access probe collisions. In the illustrated embodiments described above, these distinctions are drawn by comparing the energy of corrupted probe packets 30 with the energy threshold 26 (FIG. 2 above) in which the energy threshold 26 is preferably set to a value that has a high assurance of a single access probe 30 being successfully received. In this manner, access probes 30 of a sufficient energy with a corrupt checksum are identified as collision slots and weaker corrupt probes are identified as empty slots.

In the apersistence control application of FIG. 5, the robust identification of empty, collision, and successful timeslots is thus advantageous to unambiguously determining the load (e.g., incoming access/utilization attempts) imposed on the base station resource 150. As shown in TABLE 1 below, the access channel in a wireless EVDO network was simulated using a rate analysis window of K=56 access cycles (e.g., 5.97

Without the ability to distinguish collisions from empty slots, estimating the incoming traffic load on the base station resource 150 is difficult, since the success rate alone is ambiguous, as shown in the plot 200 of FIG. 7. The simulation results of TABLE 1 show that the maximum simulated throughput occurs at 10,400 BHCA ($N_S/56=15.07/56=0.269$). On both sides of this maximum, there are two traffic loads with similar fractional success rates. For example, the success rate for 6500 BHCA ($N_S/56=10.23/56=0.183$) is similar to that of 13,000 BHCA ($N_S/56=10.02/56=0.179$). Thus, absent the techniques of the invention to detect collisions as shown in FIGS. 1 and 2 above, when a system observes a success rate on the order of about 0.18 in a rate analysis interval, it is impossible to decide whether the resource load is 6500 BHCA or 13,000 BHCA. However, using the above-described collision detection techniques and systems of the invention, $N_C$ and $N_E$ are known or discernable, whereby the collision rate for 6500 BHCA ($N_C/56=3.176/56=0.0567$) is easily distinguished from that of 13,000 BHCA ($N_C/56=37.29/56=0.666$).

Figure 8:
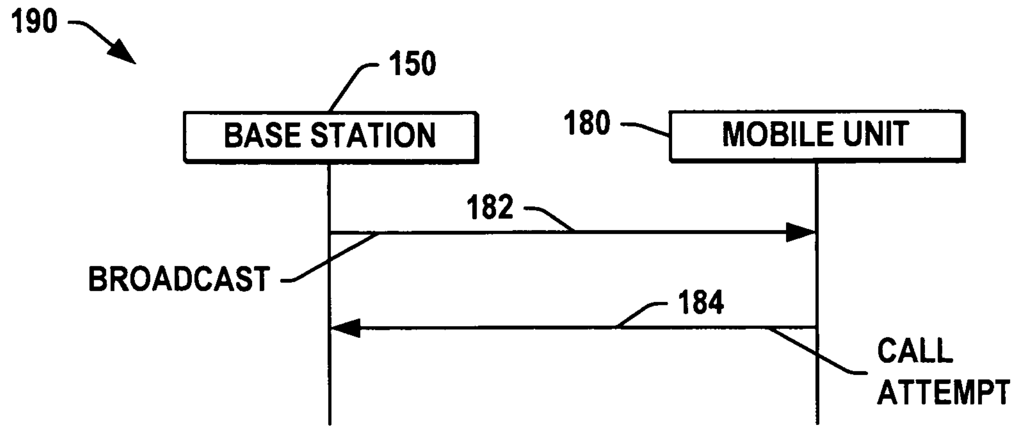
FIG. 8 is a simplified call flow diagram illustrating a broadcast message from the base station resource to the mobile unit communications devices that includes an apersistence property determined according to the estimated attempt rate from the rate determination system of FIG. 5 as well as a call initiation attempt message from a mobile device to the base station resource for attempting utilization after passing an apersistence test.
Figure 9:
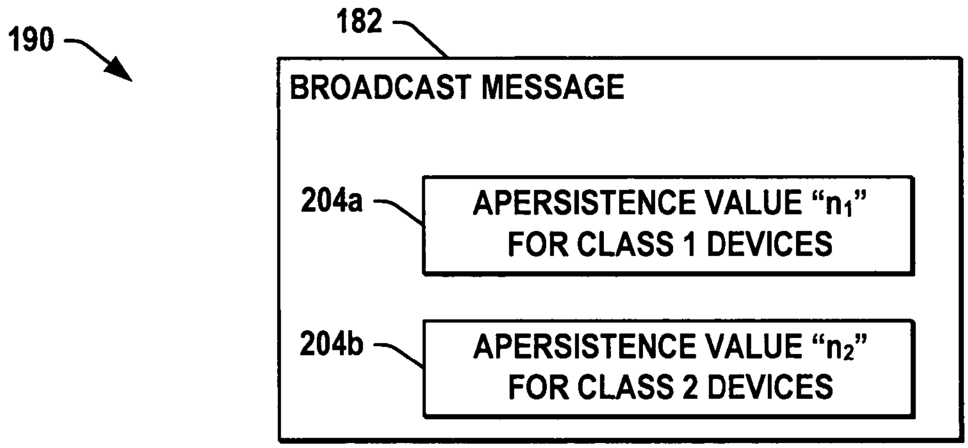
FIG. 9 is a simplified schematic diagram illustrating an exemplary broadcast message including apersistence property values for first and second priority classes in the system of FIG. 8.
Figure 10:
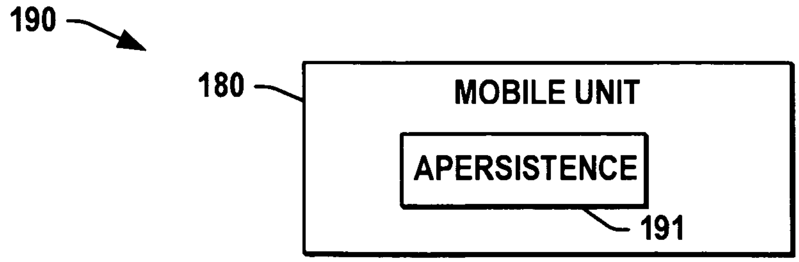
FIG. 10 is a simplified schematic diagram illustrating an exemplary mobile unit with apersistence logic for performing an apersistence test using an apersistence property value from the broadcast message of FIG. 9.
Figure 11:
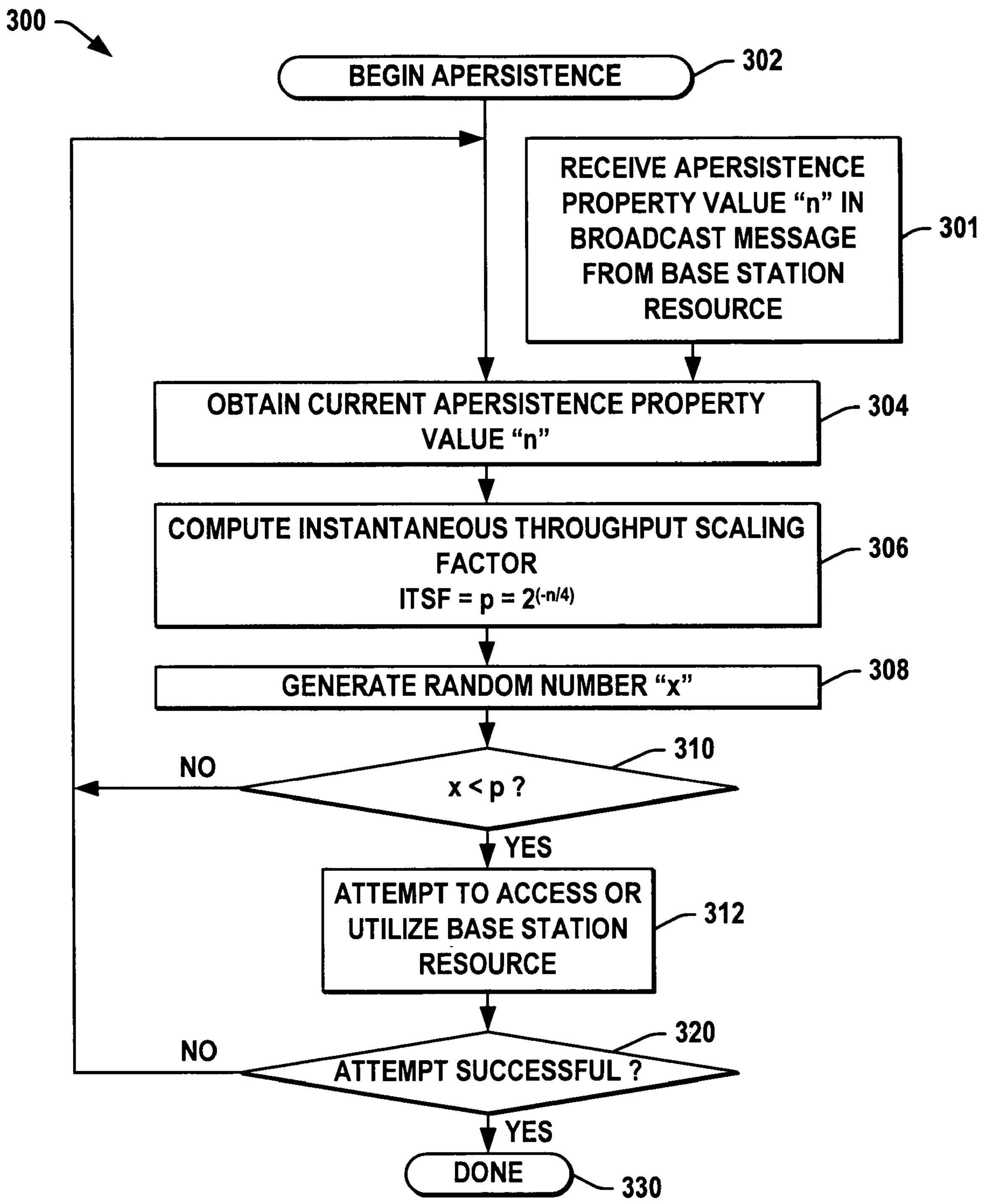
FIG. 11 is a flow diagram illustrating an exemplary apersistence test in the mobile unit of FIG. 10.

Referring now to FIGS. 5 and 8-11, using the collision differentiated timeslot and window data 28,74, the AARDS 70 can provide robust estimates of the loading of the base station resource 150 to the apersistence control system 160 for controlling system response times and throughput for single or multiple classes of mobile devices 180. As shown in FIGS. 8 and 9, the base station resource 150 periodically sends broadcast messages 182 to the mobile units 180 including apersistence values 204*a* and 204*b* corresponding to first and second (e.g., high and low) priority classes. The devices 180 then perform internal apersistence tests to decide whether and when to initiate call attempts 184. As shown in FIG. 10, the mobiles 180 include apersistence logic systems 191 that perform apersistence tests using the apersistence value 204*a* or 204*b* from the apersistence control system 160 of the base station 150. FIG. 11 illustrates an apersistence test 300 performed by the apersistence logic 191 in the exemplary mobile units 180, beginning at 302 with an apersistence property value "n" (e.g., 204*a* or 204*b*) being received at 301 from the received broadcast message 182 from the base station resource 150. The mobile 180 obtains the most recently received apersistence property value (n) 204 at 304 and computes an instantaneous throughput scaling factor (ITSF) $=p=2^{-n/4}$ at 306. A random number "x" in a range of 0 to 1 is generated at 308, which is compared to the ITSF (p) at 310 to determine whether the device 180 should attempt to access or utilize the base station 150. If the test fails (e.g., NO at 310 for x greater than or equal to p), the method 300 returns to 304 and another test is performed in the subsequent access cycle. Otherwise (YES at 310), an access/utilization attempt is made at 312, and if successful (YES at 320), the apersistence test 300 ends at 330. If unsuccessful (NO at 320), the method 300 returns to run another apersistence test at 304.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for detecting collisions in packets related to attempted access or utilization of a resource or pool of resources, the method comprising:

using a processor, determining whether a packet comprising a preamble, data, and checksum received in a given timeslot is a corrupted access probe indicating an attempted access or utilization of the resource or pool of resources; and determining whether the received packet indicates a collision occurred in the given timeslot based at least in part on an energy of the entire received packet by performing a set of actions comprising:

directly measuring the energy of the received packet without preprocessing;

comparing the energy of the received packet with a given threshold energy level; and marking the given timeslot as the collision if the energy of the received packet is above the threshold energy level.

2. The method of claim 1, further comprising marking the given timeslot as empty if the energy of the received packet is not above the threshold energy level.

3. The method of claim 2, further comprising marking the given timeslot as empty if a preamble of a received packet does not indicate the packet corresponds to an access probe packet.

4. The method of claim 2, further comprising marking the given timeslot as successful if a preamble of a received packet indicates the received packet corresponds to an access probe packet and if the received packet passes a checksum test.

5. The method of claim 1, further comprising marking the given timeslot as successful if a preamble of a received packet indicates the received packet corresponds to an access probe packet and if the received packet passes a checksum test.

6. The method of claim 1, wherein the threshold energy level is a level above which a single packet is likely to be received without error by the resource or pool of resources.

7. The method of claim 1, further comprising marking the given timeslot as successful if a preamble of a received packet indicates the received packet corresponds to an access probe packet and if the received packet passes a checksum test.

8. A collision detection system for detecting collisions in packets related to attempted access or utilization of a resource or pool of resources, the system comprising:

means for determining whether a packet received in a given timeslot is a corrupted access probe indicating an attempted access or utilization of the resource or pool of resources; and an energy measurement system to directly measure the energy of the received packet without preprocessing;

wherein the collision detection system determines whether an energy of the received packet is above a threshold energy level, and if so, identifying the received packet as a collision for the given timeslot.

9. The system of claim 8, wherein the collision detection system is integrated in a base station resource of a wireless communications system.

10. A base station resource of a wireless communication system, comprising:

means for receiving incoming data packets in a given time period including access probe requesting access or utilization of the base station resource by a plurality of wireless mobile communications units;

an energy measurement system to directly measure an energy associated with incoming packets in the given period without preprocessing;

a collision detection system to provide timeslot data for the given time period, the timeslot data comprising an indication of attempts to access or utilize the base station in the given time period, the indication having a value of empty, collision, or successful, wherein the collision detection system determines whether a received packet indicates a collision in the given timeslot based at least in part on the directly measured energy of the received packet.

11. The base station resource of claim 10, wherein the collision detection system compares the measured energy of the received packet with a threshold energy level and sets the timeslot data indication to collision for the given time period if the received packet is a corrupted access attempt packet and the energy of the received packet is greater than the threshold energy level.

12. The base station resource of claim 11, wherein the threshold energy level is a level above which a single packet is likely to be received without error by the base station resource.

13. The base station resource of claim 12, wherein the collision detection system is operative to determine whether no packet has been received in the given time period and to determine whether a received packet is an access probe packet, and wherein the collision detection system sets the timeslot data indication to empty if no packet is received in the given time period or if the received packet is not an access probe packet.

14. The base station resource of claim 13, wherein the collision detection system is operative to determine whether a received packet is an access probe packet and whether the received packet is corrupted, and wherein the collision detection system sets the timeslot data indication to successful if the received packet is an access probe packet and the received packet is not corrupted.

15. The base station resource of claim 12, wherein the collision detection system is operative to determine whether a received packet is an access probe packet and whether the received packet is corrupted, and wherein the collision detection system sets the timeslot data indication to successful if the received packet is an access probe packet and the received packet is not corrupted.

16. The base station resource of claim 11, wherein the collision detection system is operative to determine whether no packet has been received in the given time period and to determine whether a received packet is an access probe packet, and wherein the collision detection system sets the timeslot data indication to empty if the received packet is not an access probe packet.

17. The base station resource of claim 16, wherein the collision detection system is operative to determine whether a received packet is an access probe packet and whether the received packet is corrupted, and wherein the collision detection system sets the timeslot data indication to successful if the received packet is an access probe packet and the received packet is not corrupted.

18. The base station resource of claim 11, wherein the collision detection system is operative to determine whether a received packet is an access probe packet and whether the received packet is corrupted, and wherein the collision detection system sets the timeslot data indication to successful if the received packet is an access probe packet and the received packet is not corrupted.

19. The method of claim 1, wherein the determining whether the received packet indicates a collision occurred in the given timeslot is based on an energy of the received packet.

20. The collision detection system of claim 8, wherein the means for measuring the energy of the received packet measures the energy of an entire received packet.

21. The base station resource of claim 10, wherein the collision detection system determines whether a received packet indicates a collision in the given timeslot based at least in part on the measured energy of an entire received packet.

22. The method of claim 1, wherein determining whether the received packet indicates a collision occurred in the given timeslot is based at least in part on the energy of the entire received packet.

* * * * *